(12) United States Patent  (10) Patent No.: US 9,210,104 B2
Fung  (45) Date of Patent: *Dec. 8, 2015

(54) SWITCH FABRIC

(71) Applicant: Hei Tao Fung, Fremont, CA (US)

(72) Inventor: Hei Tao Fung, Fremont, CA (US)

( * ) Notice: Subject to any disclaimer, the term of this patent is extended or adjusted under 35 U.S.C. 154(b) by 376 days.

This patent is subject to a terminal disclaimer.

(21) Appl. No.: 13/867,045

(22) Filed: Apr. 20, 2013

(65) Prior Publication Data

US 2014/0307580 A1  Oct. 16, 2014

Related U.S. Application Data

(63) Continuation-in-part of application No. 13/862,416, filed on Apr. 13, 2013, now Pat. No. 9,025,459.

(51) Int. Cl.
*H04L 12/933* (2013.01)
*H04L 12/947* (2013.01)
*H04L 12/931* (2013.01)
*H04L 12/709* (2013.01)

(52) U.S. Cl.
CPC .......... *H04L 49/1515* (2013.01); *H04L 49/351* (2013.01); *H04L 49/50* (2013.01); *H04L 45/245* (2013.01)

(58) Field of Classification Search
CPC ..... H04L 47/125; H04L 45/245; H04L 49/50; H04L 49/1515; H04L 49/351; H04L 46/125
USPC .......................................................... 370/254
See application file for complete search history.

(56) References Cited

U.S. PATENT DOCUMENTS

| 8,358,597 | B2 | 1/2013 | Fung | |
|---|---|---|---|---|
| 8,830,835 | B2 * | 9/2014 | Casado et al. | 370/235 |
| 8,964,563 | B2 * | 2/2015 | Jocha et al. | 370/236.2 |
| 9,025,459 | B2 * | 5/2015 | Fung | 370/235 |

* cited by examiner

*Primary Examiner* — Jung Park
*Assistant Examiner* — Albert Shih

(57) ABSTRACT

A system and methods of using commodity switches to produce a switch fabric are disclosed. The system comprises switches organized in tiers. Each switch is connected to switches in higher tiers via its uplink switch ports and to switches in lower tiers via its downlink switch ports. A packet received from any downlink switch port is forwarded to one of the at least one link aggregation of uplink switch ports. A packet received from any uplink switch port is forwarded according to the first label in the packet. Each switch in the highest tier is configured to insert one or more labels in a packet to be sent out via the switches. A value in a label indicates the switch port to be selected to send out the packet received at a switch.

20 Claims, 12 Drawing Sheets

| Key | Egress port | Path 1 label | Reverse path 1 label | Path 1 status | Path 2 label | Reverse path 2 label | Path 2 status |
|---|---|---|---|---|---|---|---|
| ... | ... | ... | ... | | ... | ... | ... |
| 00:00:10:00:00:30 | Port 1 | 0x88a83939 | 0x88a80111 | Green | 0x88a84038 | 0x88a80416 | Green |
| 00:00:20:00:20:25 | Port 1 | 0x88a84048 | 0x88a80120 | Green | 0x88a83045 | 0x88a80528 | Red |
| 00:00:1c:03:22:f2 | Port 4 | 0x88a81053 | 0x88a8d022 | Green | 0x88a81454 | 0x88a8d042 | Green |
| ... | ... | ... | ... | | ... | ... | |
| | | | | | | | |
| | | | | | | | | switch

SWITCH FABRIC

FIELD OF THE INVENTION

This application related to computer networking and more particularly to building a fabric of Ethernet switches.

BACKGROUND

Recently due to the emergence of distributed computing at data centers, a scalable Ethernet switch network that has congestion alleviation capability becomes desirable. Connecting Ethernet switches in a fat-tree topology and managing them as a typical Local Area Networks (LANs) with spanning tree protocol (STP) or as a typical Internet Protocol (IP) subnets with routing protocols has been known to allow an Ethernet switch network to grow in scale. However, there are short-comings associated with that. For example, the switching paths among end-stations are static, and the network therefore is susceptible to network congestion without alleviation.

Software defined networking (SDN) is an approach to building a computer network that separates and abstracts elements of the networking systems. It has become more important with the emergence of virtualization where virtual machines (VMs) may be dynamically spawned or moved, to which the network needs to quickly respond. SDN decouples the system that makes decisions about where traffic is sent (i.e., the control plane) from the system that forwards traffic to the selected destination (i.e., the data plane). OpenFlow is a communications protocol that enables the control plane to access and configure the data plane.

Recently, there have been commodity OpenFlow Ethernet switches in the market. Those switches are relatively low-cost, but they also have severe limitations in terms of the number of classification entries and the variety of classification keys. Supposedly, an OpenFlow device offers the ability of controlling the traffic by flows. The ability can be utilized in alleviating congestion in the case of a switch fabric. The severe limitations of those switches greatly discount the ability because the number of flows that can be configured on those switches is relatively small, e.g. in thousands. Those limitations are inherent in the hardware designed and have nothing to do with OpenFlow, and OpenFlow is still good for enabling the control plane to configure the data plane. However, the assumption that the control plan can configure many (e.g. millions) of flows via OpenFlow or even any other communications protocol functionally similar to OpenFlow to the data plane may not hold. In this invention, we disclose a system and methods of using commodity switches to produce a scalable, load-balanced Ethernet switch fabric, taking into considerations the limitations of the commodity switches and the requirements of high availability.

SUMMARY OF THE INVENTION

An object of the invention is to produce a load-balanced, scalable switch fabric. The switch fabric behaves like one huge switch.

The system comprises a plurality of switches. The switches are organized in tiers. Each switch comprises uplink switch ports and downlink switch ports. The switch is connected to switches in higher tiers via uplink switch ports and to switches in lower tiers via downlink switch ports. The switches in the lowest tier are connected to the devices external to the system via downlink switch ports. The switches in the system are switches with standardized functions except that the switches in the highest tier may need some adaption from switches with standardized functions when certain embodiments in this disclosure are used.

A management module may provide the capability of provisioning and configuring the switches. On each switch, at least one link aggregation is configured with the uplink switch ports. A packet received from any downlink switch port is forwarded to one of the at least one link aggregation of uplink switch ports. A packet received from any uplink switch port is forwarded according to the first label in the packet. Each switch in the highest tier is configured to insert one or more labels in a packet to be sent out via the switches. A value in a label indicates the switch port to be selected to send out the packet received at a switch.

It is also an object of the invention that the switch fabric responds quickly to failure and congestion.

Each switch in the highest tier stores a plurality of alternate paths for a packet destined to an external device. The switch sends out probing packets to test viability of the alternate paths and avoids the broken paths.

The invention addresses the typical requirements of a typical data center network, namely scalability, high-availability, and efficiency. The system is scalable because more switches may be added to provide higher capacity and expand the switch fabric in number of tiers and in numbers of switches in tiers. The system is highly-available because there can be built-in redundancy in connectivity and capacity and a failure in a switch port or a switch can be alleviated by responding quickly in leveraging the redundancy. The system is efficient because of its ability in load-balancing the traffic taking advantage of the redundancy.

Moreover, the invention addresses some practical limitations in provisioning and configuring the switches of the system. The limitations include the number of classification entries available on the switches and the non-negligible time in reconfiguring the switches in case of failure. Our invention requires only tens or hundreds of classification entries on a switch. That is well within the capability of low-cost commodity switches in the market. Also, re-configuring the switch takes time which is not negligible in view of high-availability requirement, but our system requires minimal re-configuration of the switches in response to failure. Also, it may require only standardized functions of the switch. In some embodiments disclosed, there is no need for new hardware components or switch chips other than what have been already available in the market. Also, it requires no new functionality or adaptation in the external devices connected to the system.

BRIEF DESCRIPTION OF THE DRAWINGS/FIGURES

The present disclosure will be understood more fully from the detailed description that follows and from the accompanying drawings, which however, should not be taken to limit the disclosed subject matter to the specific embodiments shown, but are for explanation and understanding only.

Figure 8A:
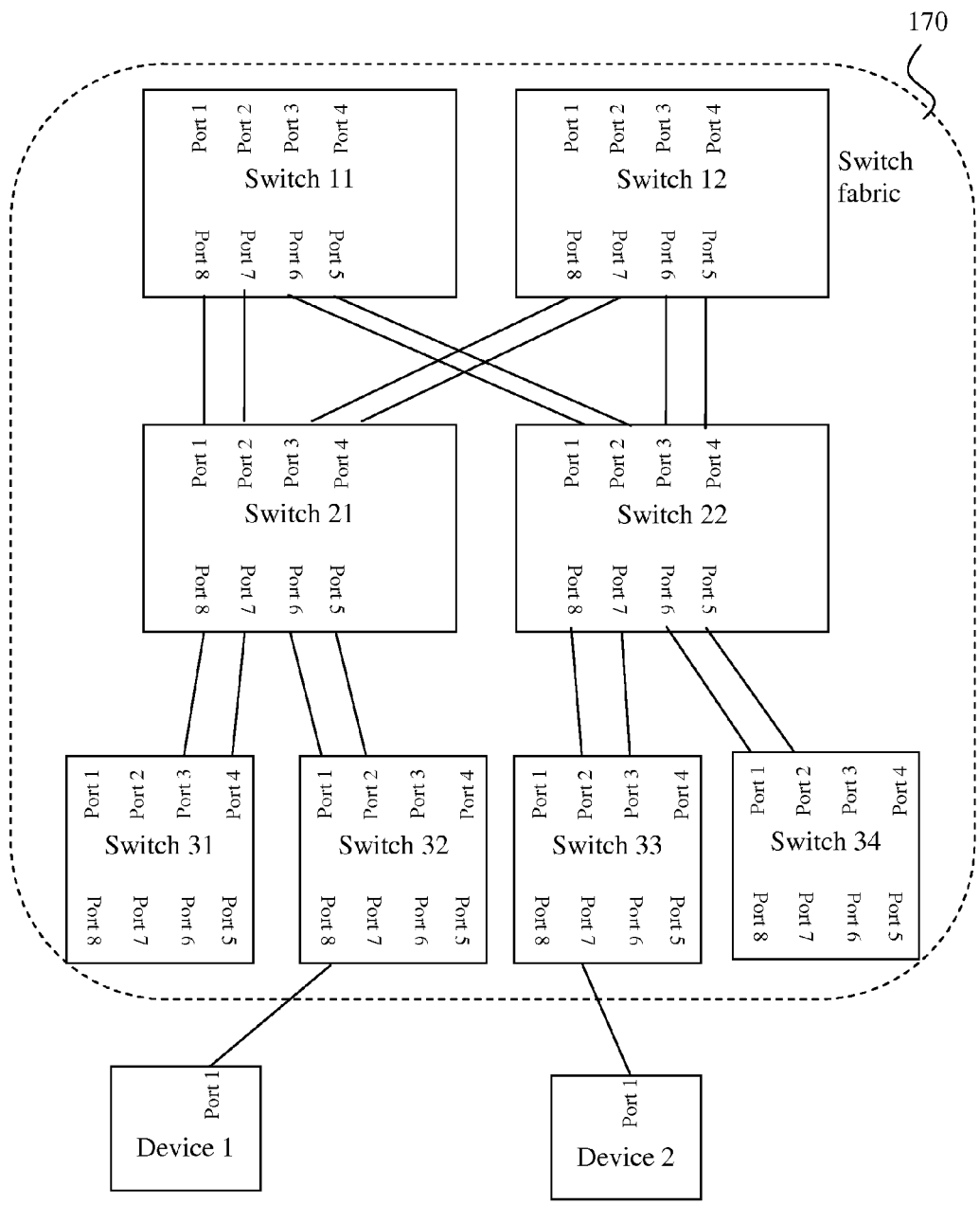

FIG. 8*a* illustrates a strict topology of interconnecting switches.

Figure 8B:
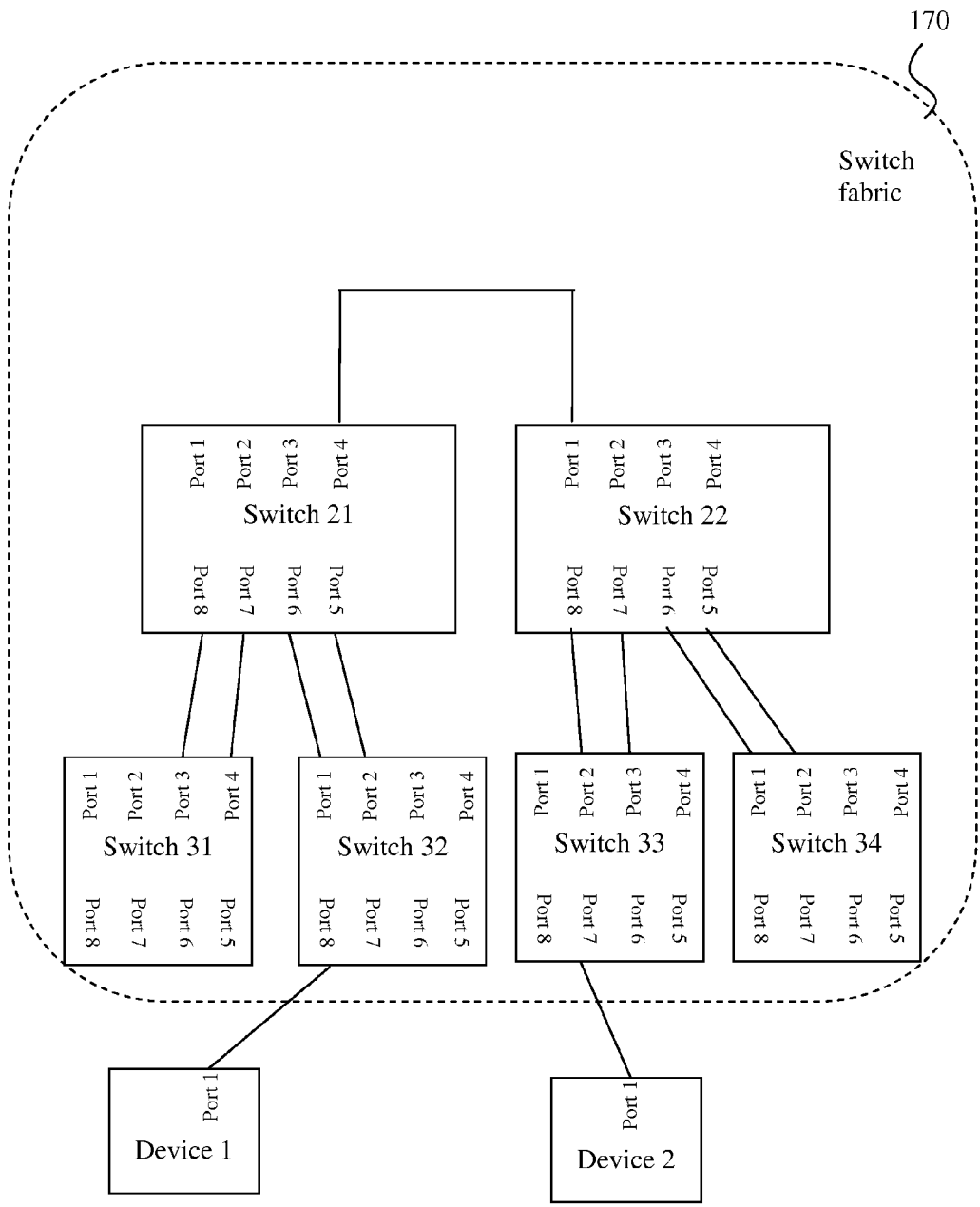

FIG. 8*b* illustrates a less strict topology of interconnecting switches.

FIG. 9 illustrates an embodiment of storing alternate paths on a switch.

DETAILED DESCRIPTION OF THE INVENTION

The system comprises a plurality of switches organized in tiers. There should be at least one tier. To scale the system, however, there should be multiple tiers. A switch has a limited number of switch ports. In other words, there are a limited number of connections that can be made to a switch. To support many external devices connected to the system, the system should have many switches. The switches should be interconnected to provide communications among the external devices. Organizing the switches in tiers would achieve inter-connectivity. Packets from an external device may enter a switch in the lowest tier and be forwarded to switches in higher tiers, then eventually to a switch in the highest tier. On the switch in the highest tier, the packets may be subject to typical switching and routing operations. Then the packets are forwarded to switches in the lower tiers, to a switch in the lowest tier, and eventually to the destined external device. Usually, a switch in a higher tier has larger capacity than a switch in a lower tier. A switch in a higher tier aggregates the traffic from switches in a lower tier.

Each switch comprises uplink switch ports and downlink switch ports. The switch is connected to switches in higher tiers via uplink switch ports and to switches in lower tiers via downlink switch ports. A switch port cannot be both an uplink switch port and a downlink switch port at the same time.

In our preferred embodiment, the switches in the lowest tier are connected to the devices external to the system via downlink switch ports, and the external devices are connected only to switches in the lowest tier. In another embodiment, the devices external to the system can be connected to downlink switch ports of switches in any tier. The methods to be disclosed are still applicable. Sometimes, it is even desirable to have external devices connected to downlink switch ports of switches in higher tiers because those downlink switch ports may have a higher bandwidth than the downlink switch ports of the switches in the lowest tier. As for the preferred embodiment we find it easier to perceive the system as one huge switch.

Figure 1:
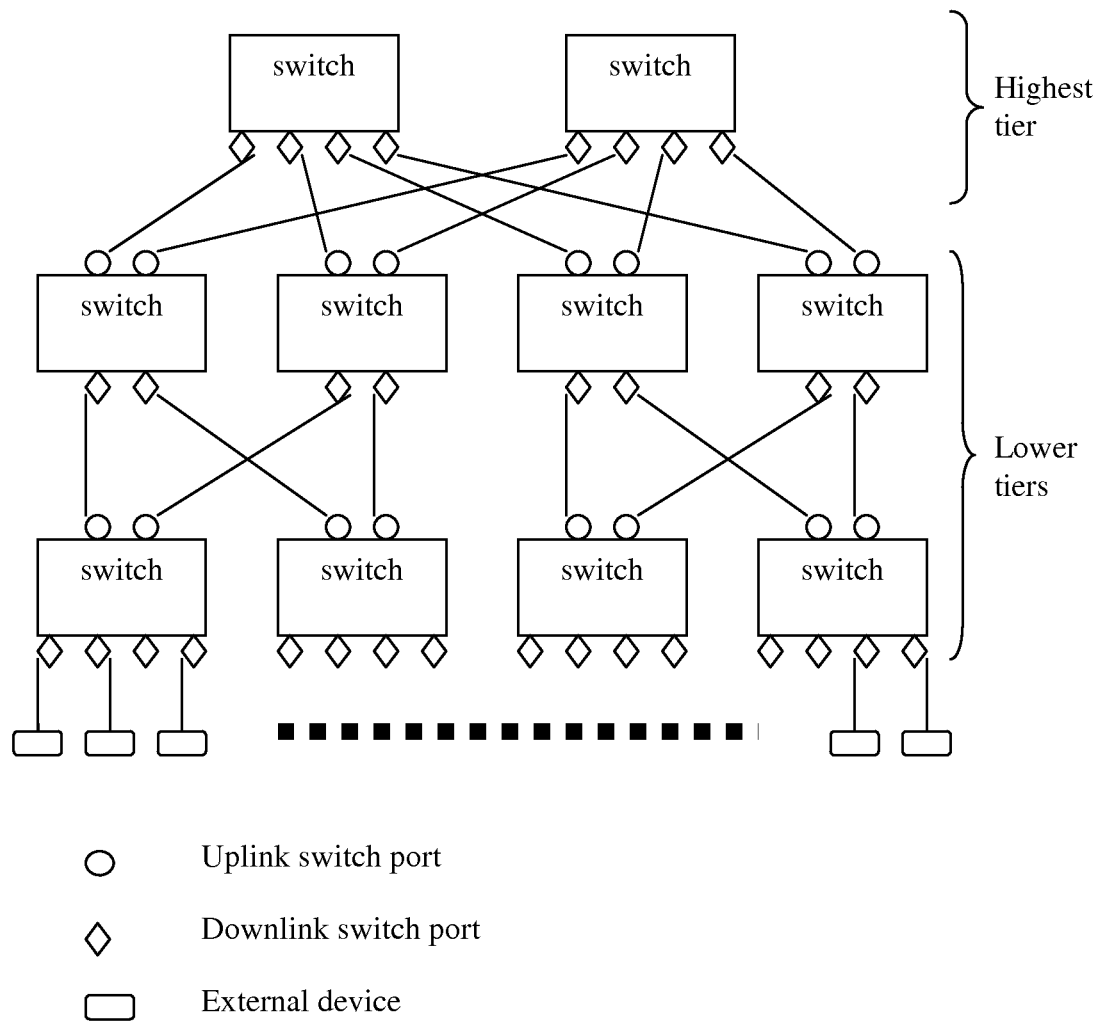
FIG. 1 illustrates an embodiment of the system disclosed.

FIG. 1 illustrates one embodiment of the system. There are three tiers of switches in the system. There is no direct connection among switches in the same tier, but switches in the higher tiers provide indirect connectivity to switches in the lower tier. The external devices are connected to the switches in the lowest tier. A switch in one tier is connected to more than one switch in the next higher tier and to more than one switch in the next lower tier so that there is sufficient connectivity and redundancy within the system. There should be sufficient connectivity to enable each switch in the highest tier to reach any switch in the lowest tier.

An external device may be a switch, a router, a server, a computer, or other network-capable equipment. It may even represent a virtual device such as a VM on a server. An external device is considered to be an element outside the system because it plays no role in the system. The external devices use the system as one huge switch utilizing whatever original functions provided at the switches in the highest tier.

The switches in our system are preferred to be Ethernet switches for the reasons of cost and ubiquity. Typical switches are capable of forwarding traffic by packet classification and performing actions on a packet including sending out the packet on a specified port and removing a header from the packet. The packet classification is usually performed via a TCAM (Ternary Content Addressable Memory). A TCAM consists of a number of entries, whose positions indicate the preferences of the entries. A lookup key is formed out of the content of a packet, e.g., the headers of a packet. A lookup using the lookup key is launched on all TCAM entries. Though there may be one or more hits in the same lookup, the entry in the most preferred position will be selected, and the resulting action associated with the entry will be performed on the packet. TCAM is considered a precious resource on a switch, and a low-cost switch may support a small number of TCAM entries, for example, in the range of thousands. Traffic load balancing can be achieved by classifying traffic into flows using TCAM. However, a typical data center switch fabric can easily have more than thousands of flows where a flow is identified by the five tuples comprising destination IP (Internet Protocol) address, source IP address, protocol, source port number and destination port number.

A management module may be used to provision and configure the switches. Provisioning generally includes some operations in addition to configuring such as cabling. Configuring may include the manual operations and the automatic and dynamic operations of setting up functional rules on the switches. In this invention, a preferred embodiment is performing the disclosed method automatically as executing preprogrammed instructions on a processor. Another embodiment is performing the disclosed method partially manually and partially automatically although manual operations would be burdensome on a human operator. Considering the possibility of various embodiments, we simply use the term configuring in a broad sense to provide room for accommodating various embodiments. The management module is a physical or logical entity able to configure the switches. The management module can be a physical machine connected to the switch fabric. The management module can also be a virtual machine running on a physical machine connected to the switch fabric. The management module can also be a virtual machine or physical machine connected to the switches in the system via an external network. The management module can also be a software module running on a switch within the switch fabric. Regardless of the embodiment, it is vital, however, that the management module has communication connectivity to the switches so that it can configure the switches. From OpenFlow viewpoint, it can be considered as an OpenFlow controller. In our preferred embodiment, the management module can configure the switches via OpenFlow, but any other protocol similar to OpenFlow may be used.

The disclosed method comprises several key steps. The steps do not need to be performed sequentially nor in the described order. Performing the steps enables the switch fabric to load-balancing the traffic between the external devices and to be responsive to failure within the switch fabric. The steps include: configuring link aggregations of uplink switch ports, referred to as uplink link aggregations; configuring forwarding rules on the switches to forward packets received from downlink switch ports to the uplink link aggregations; configuring the switches in the highest tier to insert labels into packets to be sent; and configuring forwarding rules on the switches to forward packets received according to the labels in the packets.

To enable traffic distribution from the external devices towards the switches in the highest tier requires the step of configuring link aggregations of uplink switch ports and the step of configuring forwarding rules on the switches to forward packets received from downlink switch ports to the link aggregations.

On each switch not in the highest tier, at least one link aggregation is configured with its uplink switch ports. A link aggregation of switch ports behaves like a logical switch port. Traffic entering a member switch port is considered entering the link aggregation. The switch sends out traffic on the link aggregation via only one member switch port of the link aggregation. The member switch port selected for a specific packet is typically based on a hash value of the headers of the specific packet. Consequently, a link aggregation spreads its egress traffic over its member switch ports. A typical switch nowadays supports link aggregation. It typically supports a small number of link aggregation traffic distribution algorithms. It also typically supports quick link failover by that it automatically and quickly detects a link failure and automatically redistributes traffic affected by a failing member switch port quickly to the operational member switch ports. Often, a typical switch poses a limitation on the number of member switch ports to be included in one link aggregation. When a switch in our system has the number of uplink switch ports exceeding the limitation, it requires configuring more than one link aggregation on the switch. A link aggregation is allowed to have a single member switch port, but in that case, there is no benefit of the quick link failover. We refer to a link aggregation of uplink switch ports as an uplink link aggregation.

On each switch not in the highest tier, forwarding rules are configured to forward a packet received from any of its downlink switch ports to one of the one or more uplink link aggregations on the switch. The selection of which one of the one or more uplink link aggregations for a specific packet is based on the content of the specific packet. The forwarding rules describe what content of the packet to look at. The forwarding rules are usually implemented using the classification TCAM of the switch. A switch performs a classification lookup and forwards the packet according to the lookup result.

Figure 2:
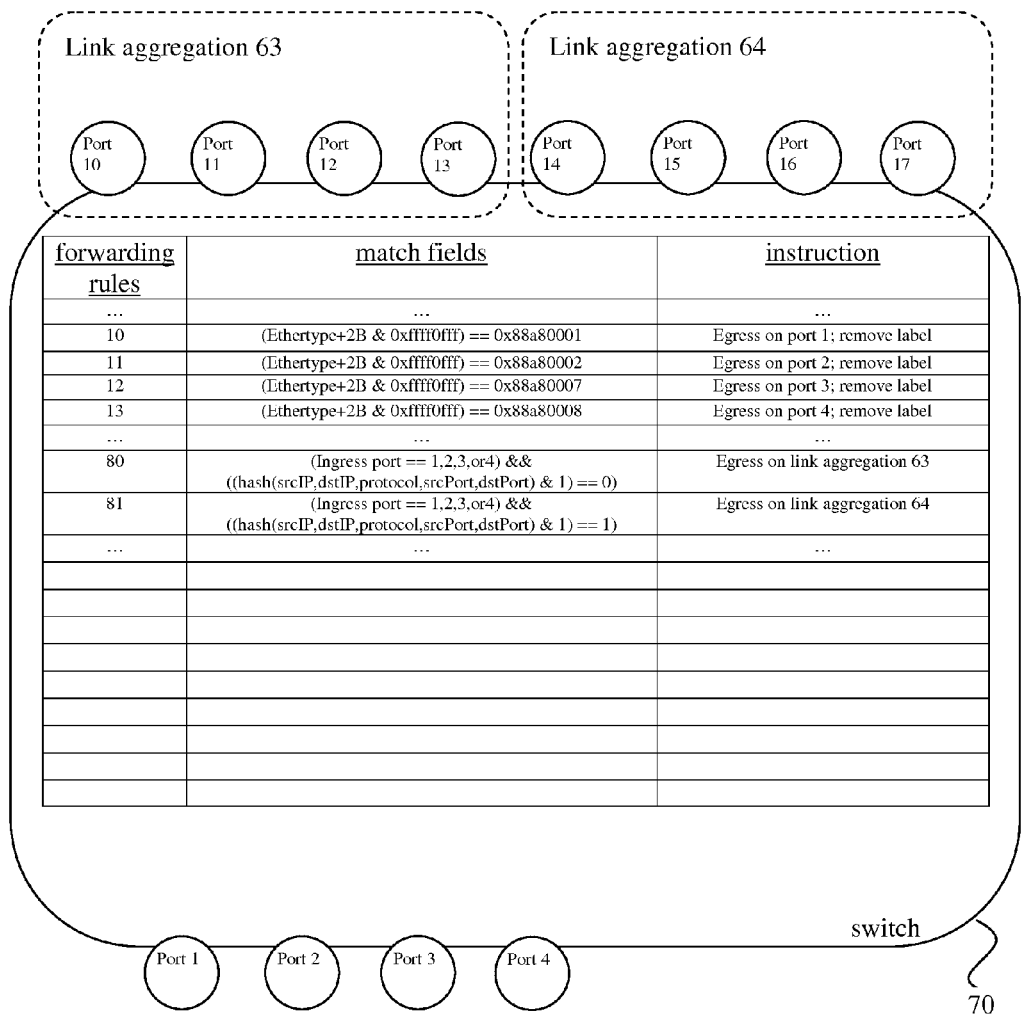
FIG. 2 illustrates an embodiment of forwarding rules on a switch.

FIG. 2 illustrates an embodiment of the forwarding rules to be configured on a switch. The forwarding rules 80-81 state that a packet received from any of ports 1-4, which are downlink switch ports, is to be forwarded to one of the two uplink link aggregations 63 and 64. The uplink link aggregation 63 comprises uplink switch ports 10-13, and the uplink link aggregation 64 comprises uplink switch ports 14-17. The forwarding rules 80-81 select an uplink link aggregation based on whether a hash value of the source IP address, the destination IP address, the IP protocol, the source port, and the destination port is even or odd. It is desirable that the algorithm of selecting a link aggregation among the link aggregations and the algorithm of selecting a member switch port within a link aggregation are different. Otherwise, traffic distribution within a link aggregation may be skewed towards certain member switch ports.

To dynamically optimize uplink traffic distribution, there are at least two ways. Firstly, the forwarding rules may be modified so that the uplink link aggregations may carry different sets of flows. For example, in FIG. 2, the forwarding rules 80-81 may be reconfigured so that when the hash value of the source IP address, the destination IP address, the IP protocol, the source port, and the destination port is a multiple of four, link aggregation 63 is used; otherwise link aggregation 64 is used. Secondly, the uplink link aggregation membership may be reconfigured so that the traffic distribution among the member switch ports may have a new and more balanced pattern.

When an uplink link aggregation is added, deleted, going up, or going down, the forwarding rules need to be re-configured so that traffic may be redistributed over the operational uplink link aggregations. To reduce the frequency of re-configuring the forwarding rules which is a time-critical operation in view of high-availability, an uplink link aggregation had better consist of at least two member switch ports, and the member switch ports had better be connected to two or more higher tier switches. A link aggregation with failed member switch ports but at least one operational switch port is still operational and can carry traffic on behalf of the failed member switch ports. As in FIG. 2, any single failure among ports 10-17 can be handled without reconfiguring the forwarding rules. It is advantageous that an uplink link aggregation has member switch ports connected to more than one switch in the higher tiers. When one of the connected switches in the higher tiers goes down and subsequently some member switch ports of the uplink link aggregation go down, the uplink link aggregation remains operational.

The combination of the two aforementioned steps achieves uplink traffic distribution with a small number of forwarding rules and responsiveness to a failure on a switch port or a switch.

To enable traffic distribution from the switches in the highest tier towards the external devices requires the step of configuring the switches in the highest tier to insert labels into packets to be sent and the step of configuring forwarding rules on the switches to forward packets received according to the labels in the packets.

The limitation of not being able to configure many forwarding rules on the low-cost switches limits the ability in controlling which switch among the switches in the highest tier may receive the uplink traffic from an external device. Therefore, it is vital for each switch in the highest tier to be able to send packets to any of the external devices. To meet that objective, there should be a fine control over directing the packets from the switches in the highest tier to the external devices through the switch fabric. In our preferred embodiment, a switch in the highest tier is configured to be able to insert one or more labels into a packet to be sent out to an external device. Each label indicates the switch port to be selected to forward the packet out among switch ports of the switch that receives the packet. A stack of labels together specifies a path comprising the egress switch ports of the switches along the path. The step of configuring a switch in the highest tier to insert labels into a packet to be sent enables the switch in the highest tier to specify the path of a packet through the switch fabric. There may exist a number of alternate paths from a switch in the highest tier to an external device. The function of discovering the paths from switches in the highest tier to external devices is best to be performed by the management module. The discovery can be achieved by the management module injecting a specific packet to a switch and directs the specific packet out on a specific switch port of the switch. Another switch that receives the specific packet is configured to forward the specific packet to the management module along with the information about the receiving switch port of the receiving switch. The management module may use OpenFlow for injection of packet to a switch and for capturing a packet from a switch. The management module may perform the discovery on every switch port of every switch and thereby understand the network topology. The management module may then determine the switch ports to be the uplink switch ports or the downlink switch ports. The management module thereby knows the paths between the switches in the highest tier and the external devices. The selection of a path may be based on a shortest path algorithm or based on traffic load or both. The information about the stack of labels associated with an external device should be configured on a switch in the highest tier. Also, when the path is no longer available, the affected switches in the highest tier should be reconfigured to use other paths.

Each switch is configured with forwarding rules to forward packets received according to the labels. Each switch is to forward a packet received from any of its uplink switch ports out on at least one of its downlink switch ports. The at least one of the downlink switch ports is selected based on the first label in the packet received. The switch is also to remove the first label from the packet, exposing a second label if there is. That is so that the next switch receiving the packet will do the forwarding based on the then first label in the packet.

In FIG. 2 the forwarding rules 10-13 are for forwarding packets to downlink switch ports based on labels.

Each forwarding rule maps a label value to a switch port. In a simple embodiment, the label values are directly mapped to switch port numbers where the switch port number can be implied from the label value, e.g., label value M indicating switch port M. In a more sophisticated embodiment, the label values are mapped one-to-one to switch ports, e.g., label value M indicating switch port N. Switches are likely to differ in their numbering of their own downlink switch ports and uplink switch ports. Therefore, the mapping of label values to switch ports can be different on different switches.

Figure 4A:
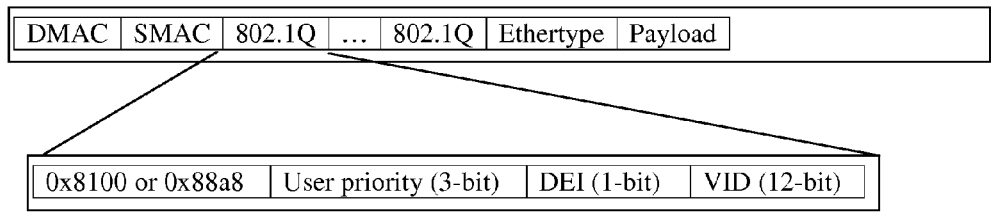
FIG. 4a-4e illustrate different embodiments of a label.

In one embodiment, the label is an IEEE 802.1Q tag. The 802.1Q tag comprises a VID (Virtual Local Area Network Identifier) field, which is supposed to indicate a VLAN (Virtual Local Area Network) identifier associated with the packet. In this embodiment, the switches are configured to interpret the VID value as an indication of the at least one egress switch port selected. That is, the VID value is the label value indicating the egress switch port(s). The 802.1Q tag also comprises a user priority field to indicate the forwarding priority of the packet. The 802.1Q tag also comprises a Tag Protocol Identifier (TPID) field. We prefer using 0x88a8 as the TPID over other values including 0x8100 and 0x9100. The 802.1Q tag in a packet is found at the original position of the Ethertype field and the next two bytes. See FIG. 4a.

The mapping of label values to switch ports is exhibited in the forwarding rules. In FIG. 2, forwarding rule 10 maps VID value 1 to switch port 1; forwarding rule 11 maps VID value 2 to switch port 2; forwarding rule 12 maps VID value 7 to switch port 3; forwarding rule 13 maps VID value 8 to switch port 4.

In another embodiment, the label is an MPLS (Multiprotocol Label Switching) label. The MPLS label has a 20-bit field, which can be used as the label value indicating the egress switch port(s).

Figure 3:
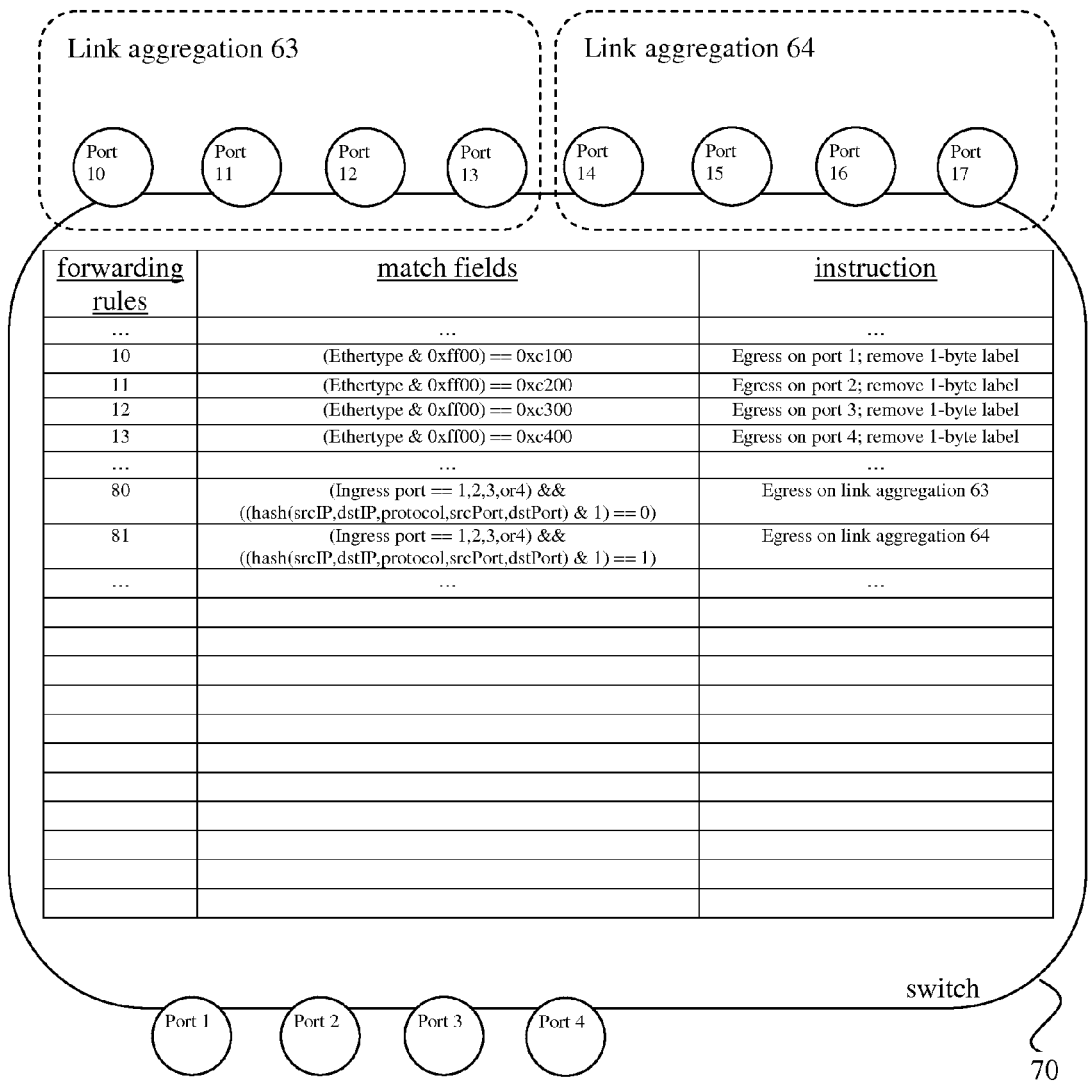
FIG. 3 illustrates another embodiment of forwarding rules on a switch.
Figure 4B:
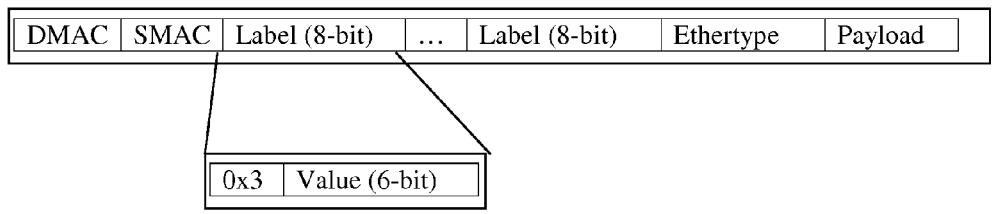

In yet another embodiment, the label is a non-standardized, special construct. It is a one-byte field inserted immediately after the source MAC (Media Access Control) address field and immediately before the Ethertype field in a packet. That is to say, the one-byte field occupies the original position of the Ethertype field. The Ethertype field is to indicate the protocol carried in the Ethernet packet. For example, for an IP packet the Ethertype field value is 0x0800, and for 802.1ad packet the Ethertype field value is 0x88a8. All Ethertype values in use are registered with the IEEE (Institute of Electrical and Electronics Engineers) organization. The one-byte field comprises '11' as the two most significant bits and a 6-bit value for indicating the egress switch port. The leading bits '11' are chosen so as to make the apparent Ethertype field value to indicate an unavailable protocol because Ethertype values between 0xc0000 and 0xffff are unregistered or not public. Our intention is such that a packet with the label can be treated as special as opposed to being a normal packet. In other words, a packet with such a label can be easily differentiated from a packet without the label. FIG. 3 illustrates the use of the one-byte label in forwarding rules 10-14. The one-byte label is described in FIG. 4b.

There is an advantage of using the aforementioned one-byte label. A stack of four labels is only four-byte. A stack of four labels enables a packet to go through four tiers of switches, and four tiers of switches are quite sufficient in many deployment scenarios. The stack of four labels occupies the position of an 802.1Q tag in a packet. OpenFlow supports classification of flow by 802.1Q tag parameters. Therefore, we may conveniently leverage OpenFlow to configure forwarding rules based on the stack of four labels. Also, we may just need to have the switches in the lowest tier to remove the stack of four labels in a packet in one shot while the switches in the higher tiers need not remove any of the four labels in the packet. In the case that there are fewer than four tiers of switches, the stack of four labels can also be used though at least one of the four labels will be bogus and have no impact on the path of a packet. In the case that there are more than four tiers of switches, two or more stacks of four labels can be used. Then the fourth next switch in the path needs to remove the first stack of four labels in the packet to expose the next stack of four labels in the packet to switches in the lower tiers, and a switch in the lowest tier needs to remove the last stack of four labels in the packet.

Figure 4C:
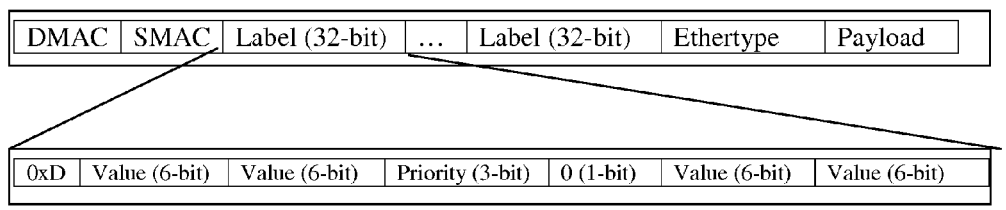

A stack of four one-byte labels can be viewed as one type of super labels. A super label comprises egress switch port selection information for more than one tier of switches. A super label is one kind of labels. A super label should be small in size. It is desirable to be four-byte like the size of an 802.1Q tag. To follow the aforementioned rational, an embodiment of a super label may be a four-byte field inserted immediately after the source MAC address field in the packet. The super label may comprise '11' as the two leading bits so that the apparent Ethertype of the packet indicates an unavailable protocol. The super label may comprise four six-bit fields to indicate egress switch ports in four tiers of switches. See FIG. 4c. The super label may even comprise three bits indicating forwarding priority of the packet. The forwarding rules of a switch in a tier are configured just to focus on fields relevant to the tier. In the case that there are more than four tiers of switches, two or more super labels can be used. Then a switch in the fourth highest tier needs to remove the first super label in a packet to expose the next stack of four labels in the packet to switches in the lower tiers, and a switch in the lowest tier needs to remove the last super label in the packet.

Figure 4D:
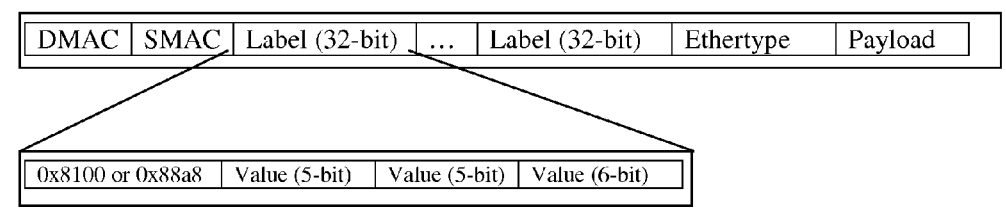

Another embodiment of a super label is an adapted three-value 802.1Q tag. The label uses the registered TPID (Tag Protocol Identifier) of 802.1Q as leading bits, i.e., 0x88a8 or 0x8100. However, the VID field, the DEI (Drop Eligible Indicator) field, and the User priority field, together 16 bits, are to be interpreted as a 5-bit value for the next switch, a 5-bit value for the second next switch, and a 6-bit value for the third next switch. The super label supports traversing through three switches. The advantage is that some commodity switches are only able to insert a standard 802.1Q tag into a packet, and the super label looks like a standard 802.1Q tag. See FIG. 4d.

Figure 4E:
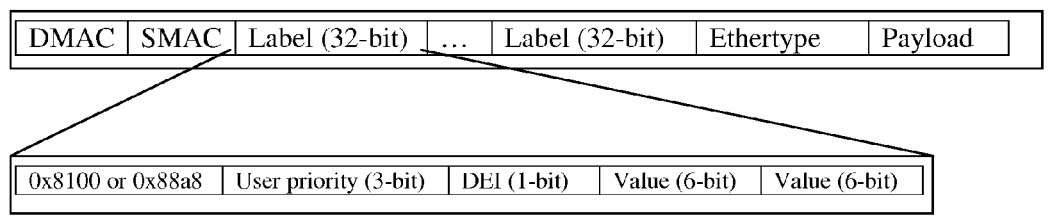

Another embodiment of a super label is an adapted two-value 802.1Q tag. The label uses the registered TPID of 802.1Q as leading bits, i.e., 0x88a8 or 0x8100. However, the VID field, the DEI field, and the User priority field, together 16 bits, are to be interpreted as a 6-bit value for the next switch and a 6-bit value for the second next switch. The super label supports traversing through two switches. The advantage is that some commodity switches are only able to support standard 802.1Q tag, and the super label looks like a standard 802.1Q tag. See FIG. 4e.

Yet another embodiment of a super label is a MPLS label. As said, an MPLS label has a 20-bit field. It can be interpreted as four 5-bit values for the next four switches. MPLS is a less common feature than 802.1Q. Some commodity switches may not support MPLS.

There is other variety of embodiments of the label. The size of the value indicating the egress switch port is important. The switches in the lowest tier need relatively more bits to represent the egress switch ports as potentially there are many external devices connected. The switches in the higher tiers may have relatively more link aggregations and therefore would need fewer bits to select a small number of link aggregations. Also, a switch in the highest tier may not require using the label to find an egress switch port. The switch in the highest tier may determine the egress switch port using typical switching and routing operations. Considering that, a super label with two values may be able to support a system of three tiers of switches.

When there is a failure in a link within the switch fabric, some paths from the switches in the highest tier to the external devices may be affected. Some switches in the highest tier may need to react by associating a different stack of labels to the external devices. That is a time-critical operation in view of high availability, and the frequency of that operation should be minimized. In our preferred embodiment, the disclosed method further comprises a step of configuring on each switch at least one link aggregation with the downlink switch ports. Each switch is configured with one or more link aggregations of its downlink switch ports, referred to as downlink link aggregations. Each of the downlink link aggregations consists of only the downlink switch ports that are connected to a same switch in a lower tier. For example, as in FIG. 5a, the switch 22 has four downlink switch ports, switch ports 7-8 connected to switch 31, switch ports 5-6 connected to switch 32. Then, there can be two downlink link aggregations, downlink link aggregation 198 of downlink switch ports 7-8, another downlink link aggregation 199 of downlink switch ports 4-5. The advantage of the embodiment is that in the case of a member switch port failure, a downlink link aggregation is still operational and there is no need to reconfigure the stack of labels or paths on the switches in the highest tier. There is a need to reconfigure the stack of labels or paths on the switches in the highest tier only when a whole downlink link aggregation goes down, which would be the case of a switch failure, e.g., switch 31 going down.

A typical switch supports the redirection of traffic to a physical switch port and also a logical switch port, i.e., link aggregation. In our preferred embodiment, the label value may also indicate a physical switch port or a link aggregation to be selected. When we refer to mapping a label value to an egress switch port, the egress switch port can be a physical switch port or a logical switch port. When the configured forwarding rules direct a packet to a logical switch port, eventually the switch will select one member switch port of the link aggregation to send out the packet. Also, since a link aggregation may contain one member switch port or may contain more than one member switch ports, in general, redirection of traffic to a link aggregation is to mean redirection of traffic to a physical switch port, i.e., link aggregation with one member switch port, or a link aggregation with more than one member switch ports.

Figure 5A:
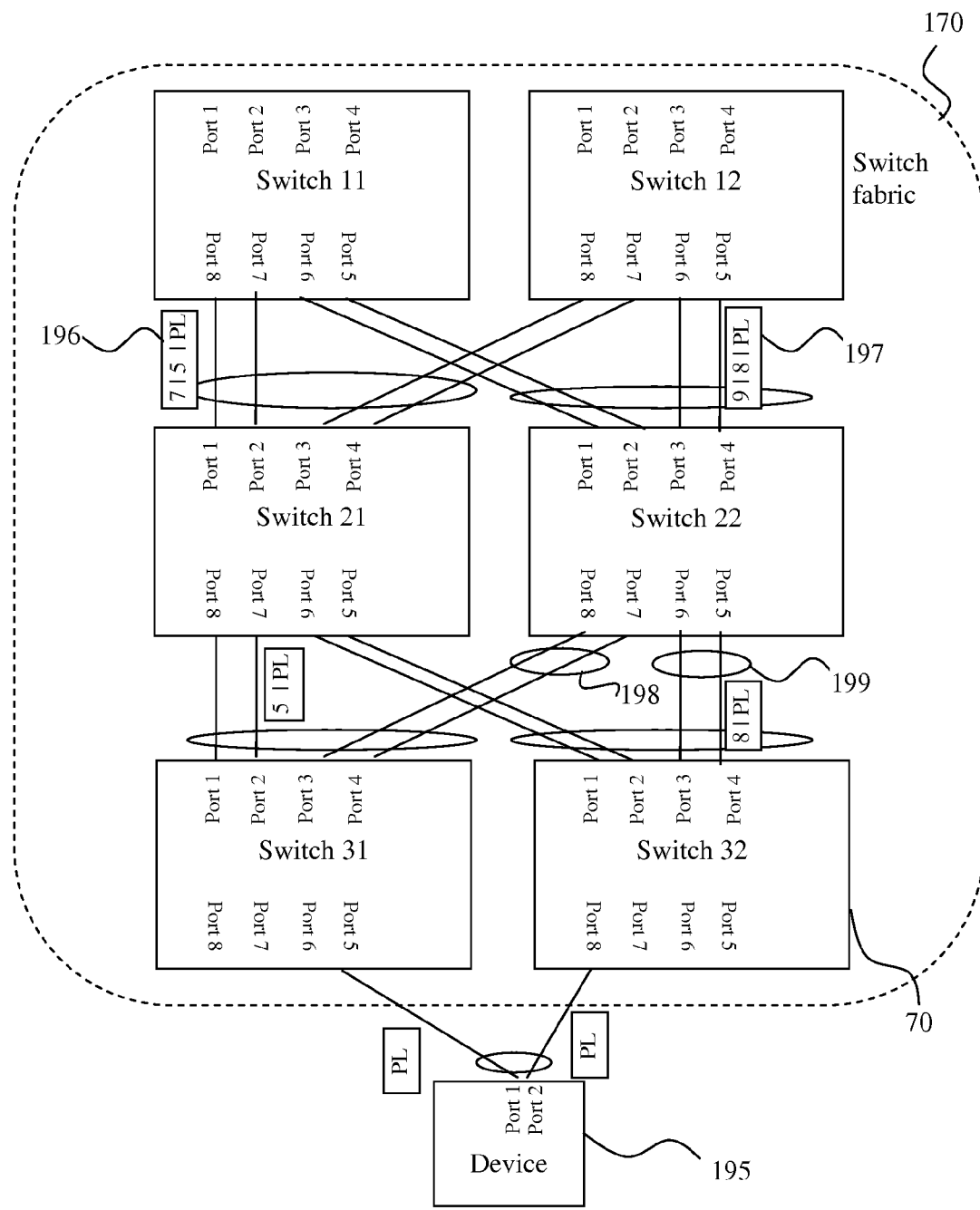
FIG. 5a-5b illustrate how packets are forwarded from a switch in the highest tier to an external device.

In FIG. 5a, switch 11 inserts a stack of labels into packet 196 and forwards the packet 196 out on port 8. A label value 7 on switch 21 directs the packet 196 out on port 7 and a label value 5 on switch 31 directs the packet 196 out on port 5 to reach the external device 195, assuming a label value M directly mapped to port M. Switch 12 inserts a stack of labels into packet 197 and forwards the packet 197 out on port 5. Suppose a label value 9 on switch 22 represents a logical switch port or link aggregation 199. Packet 197 is directed out on either port 5 or port 6 of switch 22 decided by the link aggregation traffic distribution algorithm configured on switch 22. A label value 8 on switch 32 directs the packet 197 out on port 8.

Figure 5B:
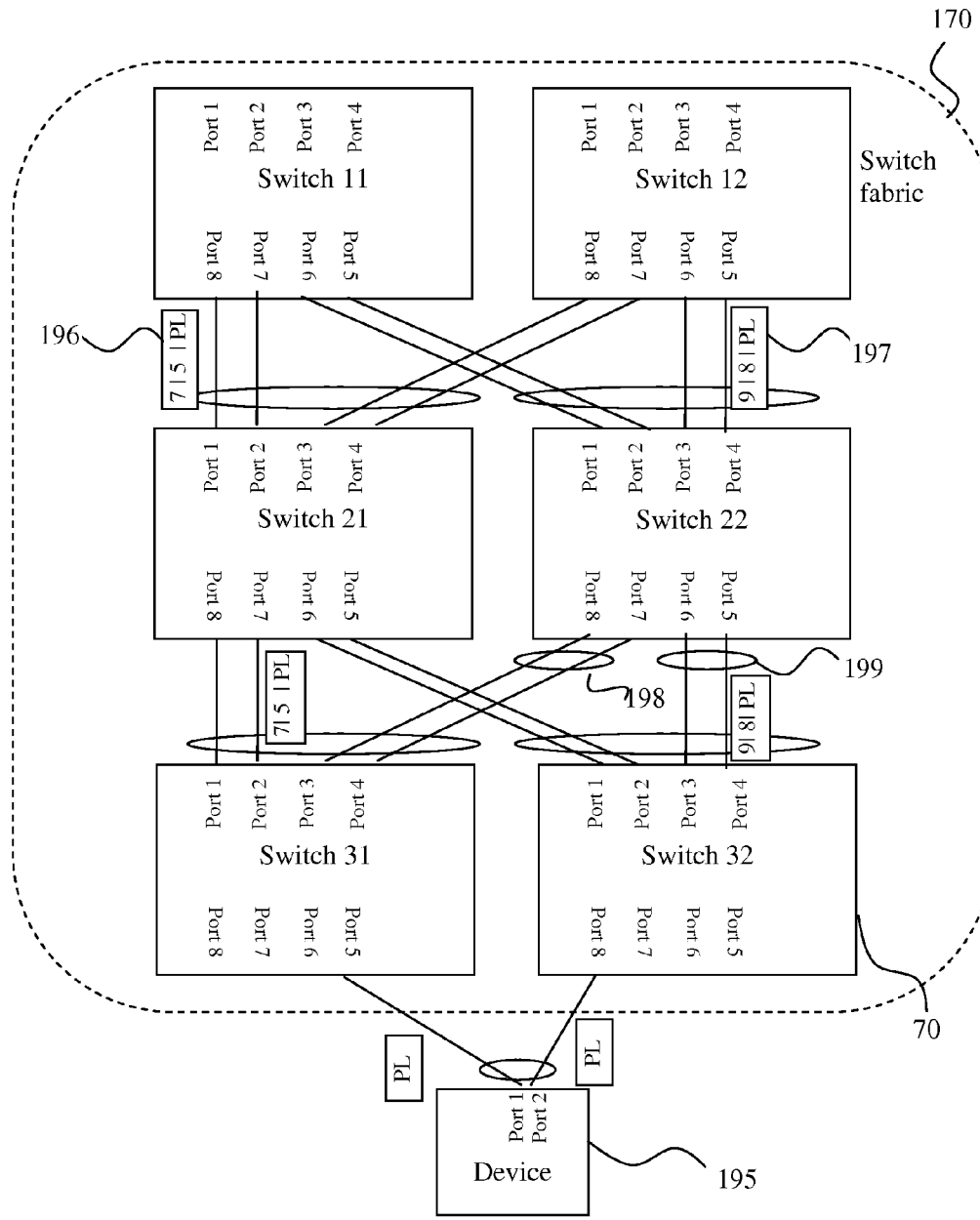

The same path traversal can be said about FIG. 5b. In FIG. 5b, however, assuming the labels are super labels, the labels are not removed from the packets until the packets have reached the switches in the lowest tier. Switch 21 and switch 22 are configured with forwarding rules that only look at the first label values in the packets. Switch 31 and switch 32 are configured with forwarding rules that only look at the second label values in the packets and remove the labels from the packets.

FIG. 5b also illustrates that it is desirable to have an external device connected to multiple switches via a link aggregation so as to have a redundant path in case of a switch failure.

Figure 6:
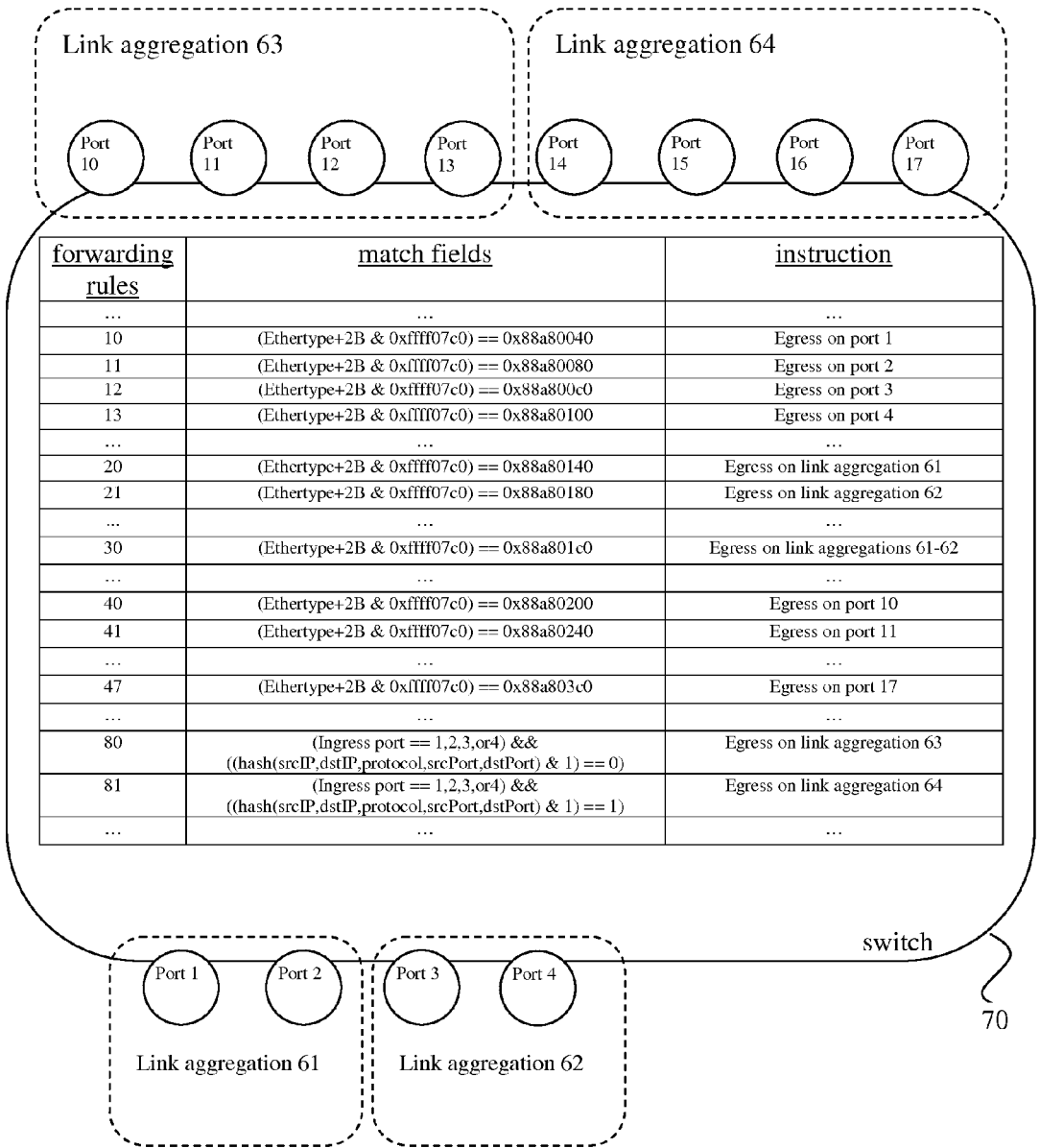
FIG. 6 illustrates an embodiment of forwarding rules on a switch.

FIG. 6 illustrates using forwarding rules to direct packets with labels out on downlink link aggregations. In the FIG. 6, the switch is using the adapted three-value 802.1Q super label described in FIG. 4d. Suppose the switch is in the second lowest tier. Its forwarding rules are configured to look at the second 5-bit value in the label. Forwarding rules 20-21 direct packets to downlink link aggregations 61-62. Note that forwarding rules 10-13 may co-exist. The label value decides whether physical switch port or link aggregation is to be selected.

A typical switch may also support the redirection of traffic to one or more egress switch ports. In our preferred embodiment, the label value may also indicate one or more switch ports to be selected. The mapping of a label value to one or more switch ports is exhibited in the forwarding rules configured on a switch. For example, in FIG. 6, forwarding rule 30 will multicast the packet to downlink link aggregations 61-62. In other words, a packet from a switch in the highest tier may be replicated at one or more switches along its paths to multiple external devices, as a result of inserting a specific stack of labels at a switch in the highest tier and configuring appropriate forwarding rules on the switches.

In our preferred embodiment, a switch is allowed to communicate to another switch via the switch fabric. That is a nice property considering the switches within the switch fabric may need to exchange some house-keeping information. To enable such communication, the forwarding rules of forwarding packets based on labels inside packets on the switches should be flexible in letting the packets with labels, whether received from uplink switch ports or downlink switch ports, to be forwarded out on an uplink switch port or, of course, a downlink switch port. Considering the fact that there are already forwarding rules that forward packets received from downlink switch ports to uplink link aggregations, the forwarding rules of forwarding packets based on labels inside packets must take precedence. The label values can be mapped to uplink switch ports or downlink switch ports. A switch may communicate to another switch by inserting into a packet a stack of labels that directs the packet through some egress downlink switch ports and egress uplink switch ports. When a forwarding rule maps a label value into an egress uplink switch port, the uplink switch port had better be a physical switch port, not a link aggregation because the link aggregation may have member switch ports connected to more than one switch at a higher tier. The stack of labels is supposed to dictate the specific switches along the path.

In FIG. 6, the forwarding rules 40-47 may forward packets to uplink switch ports 10-17, respectively. The forwarding rules 40-47 are in preferred positions over the forwarding rules 80-81, assuming the smaller the rule number, the higher the preference. A packet that may satisfy both forwarding rule 40 and forwarding rule 80 will use the instructions associated with forwarding rule 40.

Figure 7:
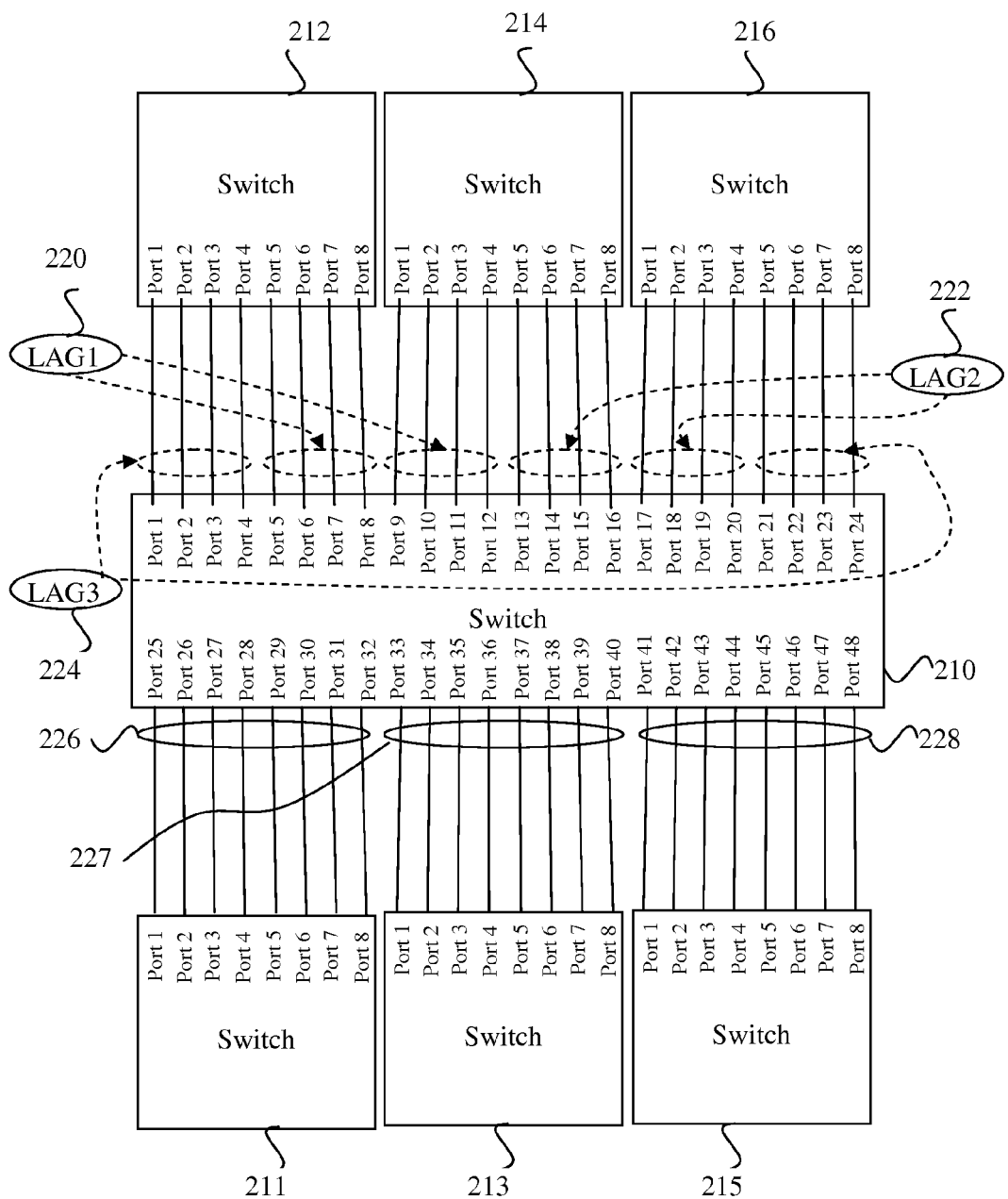
FIG. 7 illustrates an embodiment of link aggregations.

FIG. 7 illustrates an embodiment of assignment of member switch ports to link aggregations. Support that the switch 210 can support up to eight member switch ports in a link aggregation. Ports 1-24 of switch 210 are uplink switch ports. It is desirable to have each uplink link aggregation consist of member switch ports connected to two switches. Therefore, it is desirable to have uplink link aggregation 220 with ports 5-12, uplink link aggregation 222 with ports 13-20, and uplink link aggregation 224 with ports 1-4 and 21-24. Ports 25-48 of switch 210 are downlink switch ports. It is desirable to have each downlink link aggregations consist of member switch ports connected to only one switch. Therefore, it is desirable to have downlink link aggregation 226 with ports 25-32, downlink link aggregation 227 with ports 33-40, and downlink link aggregation 228 with ports 41-48. The configurations would enable minimal reconfigurations responding a single failure. For example, when switch 212 goes down, link aggregation 220 and link aggregation 224 are still operational. When switch port 25 of switch 210 goes down, the link aggregation 226 is still operational. The switches in the highest tier need to be reconfigured not to use any stack of labels utilizing switch 211 only when switch 211 goes down.

For the switch fabric to behave like one huge switch, any external device should be able to reach any other external device. An external device may do so first by reaching out to a switch in the highest tier and by letting the switch in the highest tier direct the packets to the destined external device. To support that, the switches should be sufficiently connected to enable packets from any of the switches in the highest tier to reach any external device connected to a downlink switch port on any switch.

In FIG. 8a, the switch 11 and switch 12 provide sufficient connectivity as switch 21 and switch 22 are otherwise not connected. When there is no direct connectivity among switches in the same tier, switches in a higher tier should provide the needed connectivity. However, it is sometimes desirable to provide direct connectivity among switches in the same tier. For example, for cost-effectively scaling the switch fabric, it is sometimes desirable to interconnect the switches in the highest tier, as in FIG. 8b. Switch ports inter-connected to two switches in the same tier should be treated as downlink switch ports on the two switches. In FIG. 8b, switch port 4 of switch 21 is treated as a downlink switch port on switch 21, and so should switch port 1 of switch 22 be treated as a downlink switch port on switch 22. The packets from the external device 1 are first to go uplink to switch 21. Switch 21 forwards the packets via downlink switch port 4 to switch 22. Switch 22 forwards the packets based on the labels. Therefore, external device 1 is still able to communicate to external device 2. In one embodiment, switch 21 may insert labels to direct the packets out on switch 22 where switch 22 forwards the packets based on labels. In another embodiment, switch 21 does not insert labels in the packets but forwards the packets to switch 22 via port 4, and then switch 22 inserts labels into the packets after switch 22 performs switching and routing operations on the packets.

Switches are organized in tiers. It may seem more organized to have switches in one tier only connected to switches in its next higher tier and switches in its next lower tier. However, other less strict topologies are also feasible. For example, it is also feasible to have a switch in one tier connected to switches in two or more higher tiers. It is also feasible to have a switch in one tier connected to switches in two or more lower tiers. It is also feasible to have a switch in one tier connected to a switch in a higher tier other than its next higher tier. It is also feasible to have a switch in one tier connected to a switch in a lower tier other than its next lower tier. It is also feasible to have external devices connected to downlink switch ports of switches in tiers other than the lowest tier. It is also feasible to have external devices connected to downlink switch ports of switches in multiple tiers.

On the other hand, when switches are physically connected in less strict topologies and when it is desirable to operate the switches logically in the strict topology where switches in one tier are only connected to switches in its next higher tier and switches in its next lower tier, pruning can be used. Pruning here refers to logically ignoring some physical connections among the switches so that the logical connections of the switches adhere to the strict topology. Pruning can be achieved by excluding the pruned switch ports from being neither downlink switch ports nor uplink switch ports. The pruned switch ports are therefore ignored in the traffic distribution. Pruning can also be achieved by configuring the pruned switch ports to enter disabled state. The management module may apply pruning when it determines problematic to use some physical connections among the switches for traffic distribution.

It is desirable that a switch in the highest tier uses multiple paths to send packets destined to a same external device. Doing so, the switch fabric will probably be better in load balancing the traffic in the switch fabric. Also, having multiple paths already configured facilitate quick response to detecting path failure.

FIG. 9 illustrates one embodiment of a switch in the highest tier. The switch comprises a hash table whose look-up key comprises the destination MAC address of the packet. When there is a hit, the look-up result produces one or more super label. Each super label represents a path for the packet involved to the destined external device identified by the destination MAC address involved. The switch may select one of the 'green' paths based on the header information of the packet such as destination MAC address, source MAC address, IP protocol, source port number, and destination port number. The switch then inserts the super label associated with the selected path into the packet and forwards the packet out on a port selected by its switching and routing operations. When the status of some paths indicates 'red', the 'red' paths are excluded from being used to send the packet. The super labels associated with the external devices can be configured by the management module on the switch. The management module learns about the external devices when the switches learn about the external devices and generates notifications.

FIG. 9 also illustrates one embodiment of determining the status of paths associated with an external device. A look-up result also produces one or more super label corresponding to the reverse paths. The switch frequently generates a crafted packet inserted with a super label of a path and a super label associated with the reverse path, and the switch does that for every path configured for every external device. The crafted packet is supposed to be forwarded through the switch fabric to a switch in the lowest tier. The switch in the lowest tier removes the first label, which is associated with the downlink path, to expose the second label, which is associated with the reverse path, and forwards the packet through the switch fabric to the switch which generates the crafted packet. The switch identifies and captures the crafted packet and mark the status of the associated path 'green'. If the switch does not receive the crafted packet back within a configured period of time, the switch may mark the status of the path 'red'.

A switch in the highest tier may be implemented as a virtual switch running on a server. The server's network interfaces can be considered as the downlink switch ports. The virtual switch has the capability of switching packets via those network interfaces.

In our preferred embodiment, the switches in the highest tier are special in that they perform the label insertion functionality. However, we also see an advantage of having the switches in the lower tiers perform the label insertion functionality. The switches in the lower tiers may handle the packets destined to the external devices local to themselves, thereby saving some capacity for the switches in the highest tier. The disadvantage is the increased complexity in managing the switch fabric.

The embodiments described above are illustrative examples and it should not be construed that the present invention is limited to these particular embodiments. Thus, various changes and modifications may be effected by one skilled in the art without departing from the spirit or scope of the invention as defined in the appended claims.

The invention claimed is:

1. A method for producing a scalable switch fabric, the method comprising:
    provisioning a plurality of switches, the plurality of switches organized in at least two tiers, wherein a switch in a tier, of the plurality of switches, comprising one or more downlink switch ports when the tier is the highest tier and comprising one or more uplink switch ports and one or more downlink switch ports when the tier is not the highest tier, is connected to zero or more switches in at least one higher tier via the one or more uplink switch ports and connected to zero or more switches in at least one lower tier via the one or more downlink switch ports;
    configuring on each switch not in the highest tier, of the plurality of switches, at least one uplink link aggregation, each of the at least one uplink link aggregation consisting of at least one of the one or more uplink switch ports;
    configuring on each switch not in the highest tier, of the plurality of switches, to forward a packet received from any of the one or more downlink switch ports out through one of the at least one uplink link aggregation, the one of the at least one uplink link aggregation being selected based on content of the packet received from any of the one or more downlink switch ports;
    configuring on each switch in the highest tier, of the plurality of switches, to insert one or more labels into a packet to be sent out to a switch in a lower tier, of the plurality of switches; and
    configuring on each switch not in the highest tier, of the plurality of switches, to forward a packet received from any of the one or more uplink switch ports out through at least one of the one or more downlink switch ports and remove the first of the one or more labels from the packet received from any of the one or more uplink switch ports when the at least one of the one or more downlink switch ports is selected based on the first of the one or more labels in the packet received from any of the one or more uplink switch ports.

2. The method of claim 1, further comprising configuring on each switch not in the highest tier, of the plurality of switches, to preferentially forward a packet received from any of the one or more uplink switch ports and the one or more downlink switch ports out through at least one of the one or more uplink switch ports and remove the first of the one or more labels from the packet received from any of the at least one uplink switch port and the one or more downlink switch ports when the at least one of the one or more uplink switch ports is selected based on the first of the one or more labels in the packet received from any of the one or more uplink switch ports and the one or more downlink switch ports.

3. The method of claim 1, wherein a downlink switch port, of the one or more downlink switch ports, is a member of a downlink link aggregation, of at least one downlink link aggregation, each of the at least one downlink link aggregation consisting of at least one of the one or more downlink switch ports, the at least one of the one or more downlink switch ports connected to a same switch, of the plurality of switches.

4. The method of claim 1, wherein an uplink link aggregation, of the at least one uplink link aggregation, consists of at least two of the one or more uplink switch ports, wherein the at least two of the one or more uplink switch ports are connected to at least two switches in at least one higher tier.

5. The method of claim 1, wherein switch ports of a switch, of the plurality of switches, in a tier connected to another switch, of the plurality of switches, in the same tier are treated as downlink switch ports.

6. The method of claim 1, wherein the plurality of switches are sufficiently connected to enable packets from any of the switches in the highest tier to reach any external device connected to a downlink switch port on a switch, of the plurality of switches.

7. A method for producing a scalable switch fabric, the method comprising:
    provisioning a plurality of switches, the plurality of switches organized in at least two tiers, wherein a switch in a tier, of the plurality of switches, comprising one or more downlink switch ports when the tier is the highest tier and comprising one or more uplink switch ports and one or more downlink switch ports when the tier is not the highest tier, is connected to zero or more switches in at least one higher tier via the one or more uplink switch ports and connected to zero or more switches in at least one lower tier via the one or more downlink switch ports;
    configuring on each switch not in the highest tier, of the plurality of switches, at least one uplink link aggregation, each of the at least one uplink link aggregation consisting of at least one of the one or more the uplink switch ports;
    configuring on each switch not in the highest tier, of the plurality of switches, to forward a packet received from any of the one or more downlink switch ports out through one of the at least one uplink link aggregation, the one of the at least one uplink link aggregation being selected based on content of the packet received from any of the one or more downlink switch ports;
    configuring on each switch in the highest tier, of the plurality of switches, to insert one or more labels into a packet to be sent out to a switch in a lower tier, of the plurality of switches;
    configuring on each switch not in the highest tier, of the plurality of switches, to forward a packet received from any of the one or more uplink switch ports out through at least one of the one or more downlink switch ports when the at least one of the one or more downlink switch ports is selected based on the one or more labels in the packet received from any of the one or more uplink switch ports; and configuring each switch in the lowest tier, of the plurality of switches, to remove the one or more labels in the packet received from any of the one or more uplink switch ports when the at least one of the one or more downlink switch ports is selected based on the one or more labels in the packet received from any of the one or more uplink switch ports.

8. The method of claim 7, further comprising configuring on each switch not in the highest tier, of the plurality of switches, to preferentially forward a packet received from any of the one or more uplink switch ports and the one or more downlink switch ports out through at least one of the one or more uplink switch ports when the at least one of the one or more uplink switch ports is selected based on the one or more labels in the packet received from any of the one or more uplink switch ports and the one or more downlink switch ports.

9. The method of claim 7, wherein a downlink switch port, of the one or more downlink switch ports, is a member of a downlink link aggregation, of at least one downlink link aggregation, each of the at least one downlink link aggregation consisting of at least one of the one or more downlink switch ports, the at least one of the one or more downlink switch ports connected to a same switch, of the plurality of switches.

10. The method of claim 7, wherein an uplink link aggregation, of the at least one uplink link aggregation, consists of at least two of the one or more uplink switch ports, wherein the at least two of the one or more uplink switch ports are connected to at least two switches in at least one higher tier.

11. The method of claim 7, wherein switch ports of a switch, of the plurality of switches, in a tier connected to another switch, of the plurality of switches, in the same tier are treated as downlink switch ports.

12. The method of claim 7, wherein the plurality of switches are sufficiently connected to enable packets from any of the switches in the highest tier to reach any external device connected to a downlink switch port on a switch, of the plurality of switches.

13. The method of claim 7, wherein a label, of the one or more labels, is a four-byte field after the source MAC (Media Access Control) address field in a packet, the label comprising two or more values indicating switch ports to be selected in the next two or more switches that are to receive the packet respectively, of the plurality of switches.

14. A switch fabric, comprising:
a plurality of switches, the plurality of switches organized in at least two tiers, wherein a switch in a tier, of the plurality of switches, comprising one or more downlink switch ports when the tier is the highest tier and comprising one or more uplink switch ports and one or more downlink switch ports when the tier is not the highest tier, is connected to zero or more switches in at least one higher tier via the one or more uplink switch ports and connected to zero or more switches in at least one lower tier via the one or more downlink switch ports;
wherein each switch not in the highest tier, of the plurality of switches, is configured with at least one uplink link aggregation, each of the at least one uplink link aggregation consisting of at least one of the one or more uplink switch ports;
wherein each switch not in the highest tier, of the plurality of switches, is configured to forward a packet received from any of the one or more downlink switch ports out through one of the at least one uplink link aggregation, the one of the at least one uplink link aggregation being selected based on content of the packet received from any of the one or more downlink switch ports;
wherein each switch in the highest tier, of the plurality of switches, is configured to insert one or more labels into a packet to be sent out to a switch in a lower tier, of the plurality of switches;
wherein each switch not in the highest tier, of the plurality of switches, is configured to forward a packet received from any of the one or more uplink switch ports out through at least one of the one or more downlink switch ports when the at least one of the one or more downlink switch ports is selected based on the one or more labels in the packet received from any of the one or more uplink switch ports;
wherein each switch in the lowest tier, of the plurality of switches, is configured to remove the one or more labels in the packet received from any of the one or more uplink switch ports when the at least one of the one or more downlink switch ports is selected based on the one or more labels in the packet received from any of the one or more uplink switch ports.

15. The switch fabric of claim 14, wherein each switch not in the highest tier, of the plurality of switches, is configured to preferentially forward a packet received from any of the one or more uplink switch ports and the one or more downlink switch ports out through at least one of the one or more uplink switch ports when the at least one of the one or more uplink switch ports is selected based on the one or more labels in the packet received from any of the one or more uplink switch ports and the one or more downlink switch ports.

16. The switch fabric of claim 14, wherein a downlink switch port, of the one or more downlink switch ports, is a member of a downlink link aggregation, of at least one downlink link aggregation, each of the at least one downlink link aggregation consisting of at least one of the one or more downlink switch ports, the at least one of the one or more switch ports connected to a same switch, of the plurality of switches.

17. The switch fabric of claim 14, wherein an uplink link aggregation, of the at least one uplink link aggregation, consists of at least two of the one or more uplink switch ports, wherein the at least two of the one or more uplink switch ports are connected to at least two switches in at least one higher tier.

18. The switch fabric of claim 14, wherein switch ports of a switch, of the plurality of switches, in a tier connected to another switch, of the plurality of switches, in the same tier are treated as downlink switch ports.

19. The switch fabric of claim 14, wherein the plurality of switches are sufficiently connected to enable packets from any switch in the highest tier, the plurality of switches, to reach any external device connected to a downlink switch port on a switch, of the plurality of switches.

20. The switch fabric of claim 14, wherein a label, of the one or more labels, is a four-byte field after the source MAC (Media Access Control) address field in a packet, the label comprising two or more values indicating switch ports to be selected in the next two or more switches that are to receive the packet respectively, of the plurality of switches.

* * * * *